March 31, 1964

R. C. MAGGIO 3,127,300

APPARATUS FOR CONCENTRATING AND CONFINING SOLUTES FROM SOLUTIONS

Filed Feb. 14, 1961

INVENTOR.
RALPH C. MAGGIO
BY
Ernest J. Weinberger
ATTORNEY

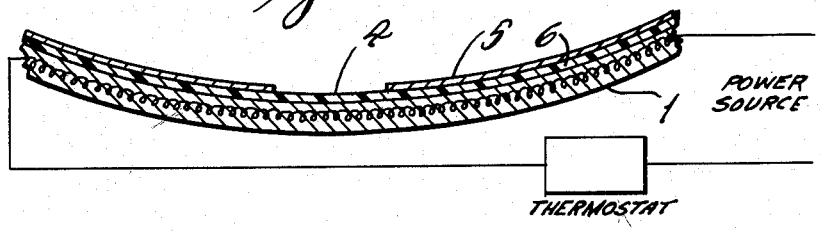
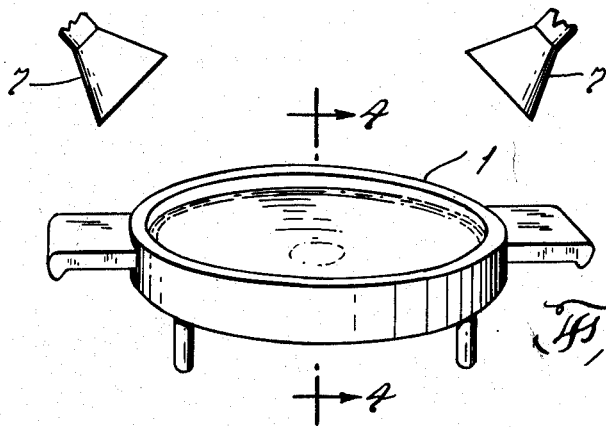
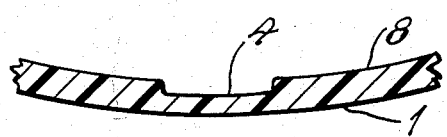

United States Patent Office 3,127,300
Patented Mar. 31, 1964

3,127,300
APPARATUS FOR CONCENTRATING AND
CONFINING SOLUTES FROM SOLUTIONS
Ralph C. Maggio, Fort Lee, N.J., assignor to the United
States of America as represented by the Secretary of
the Navy
Filed Feb. 14, 1961, Ser. No. 89,329
5 Claims. (Cl. 159—32)
(Granted under Title 35, U.S. Code (1952), sec. 266)

The invention described herein may be manufactured and used by or for the Government of the United States of America for governmental purposes without the payment of any royalties thereon or therefor.

This invention relates to concentrating and confining solutes and more particularly to concentrating solid solutes from very dilute solutions including those solutes that are radioactive and present in aqueous solutions.

Nuclear sources of energy which may be successfully employed by man include reactors of various sorts. The most common of which includes the use of water for the conversion of nuclear power into a safe source or form of energy as for example reactors employed by power companies and those found aboard Naval vessels for propulsion. In both cases the water that is employed or somes in close proximity to the nuclear material or its accessories may become somewhat radioactive due to its bombardment by high speed particles emanating from the pile or by some secondary sources. The radioactivity associated with this water is a direct indication of the operating condition of the nuclear system and, where as aboard a nuclear ship, the drinking water is also subjected to a possible source of irradiation, its radioactivity may constitute a present or potential health hazard. It is essential that all the water associated with a nuclear pile and any drinking water within its general vicinity be continually monitored for radioactivity. The problem is even more acute aboard nuclear vessels where the reactor water may be periodically discharged into the surrounding ocean while a source of water to be distilled for drinking purposes is continually taken aboard, thus creating the possibility of a dangerous situation. No matter how the solutes or salts of either the reactor or drinking water might be rendered radioactive, the concentration of the solutes or suspended solids is very small whereby in the radioactive monitoring of these waters extremely dilute solutions are always encountered. It is therefore essential that the degree of radioactivity of these very dilute solutions be determined with extreme accuracy and within a minimum of time. Where untrained personnel are to monitor the water for radioactivity, the method and apparatus must be simple, efficient and relatively foolproof.

Methods previously employed for monitoring radioactive solutions were essentially based upon evaporation techniques and in most cases repeated stages of evaporation or distillation were required. This in effect results in a number of physical transfers of the solution and requires the use of a multiplicity of laboratory glassware for a single evaluation. The solutes were finally collected in a small container and thereafter examined. It is quite obvious that with each transfer and evaporation a small fraction of the solute or solid matter would remain on the walls of the containers used and with a number of such transfers the total solute left behind might amount to a substantial fraction of the final solute collected for examination. Further, the amount of solute so left behind varies from one method to another and from one evaluation to another, thus eliminating any possibility of employing a correction factor or any accuration calibration of the method. In addition, after a container has come in contact with the radioactive solution it is left in a contaminated condition and before it may be re-used, it must be thoroughly cleaned and examined which in itself is time consuming and requires handling by skilled personnel.

The limitations imposed on the above described method also include the fact that they may only be employed where the concentration of solute is above a certain percentage and cannot be used on or for very dilute solutions. These prior methods are not satisfactory since they cannot be completed within a reasonable time and in almost all cases, time is of vital importance, and require rather high concentrations of solutes and very large volumes of solution.

An object of this invention is to provide a relatively simple, practical, rapid, inexpensive method for the determination of the radioactivity of dilute radioactive solutions.

Another object is to provide a simple inexpensive apparatus for concentrating the radioactive particles of a dilute radioactive solution, which may be easily used and operated by personnel of limited skill and experience.

Still another object is to provide an apparatus and a method for concentrating the solutes and solids from extremely dilute solutions.

A further object is to provide a method for concentrating substantially all of the radioactive solutes and solids from very dilute solutions on a continuous rapid monitoring basis where large quantities of solution are not necessary.

Other objects and advantages will be apparent from the following description of one example of the invention, and the novel features will be particularly pointed out hereinafter in connection with the appended claims.

In the accompanying drawings:

FIG. 2a and FIG. 2b are partial cross-sectional views taken approximately along line 2—2 of FIG. 1;

FIG. 3 is a perspective view of another embodiment made in accordance with this invention; and FIG. 4 is a view of part of the embodiment in cross-section taken approximately along line 4—4.

Figure 1:
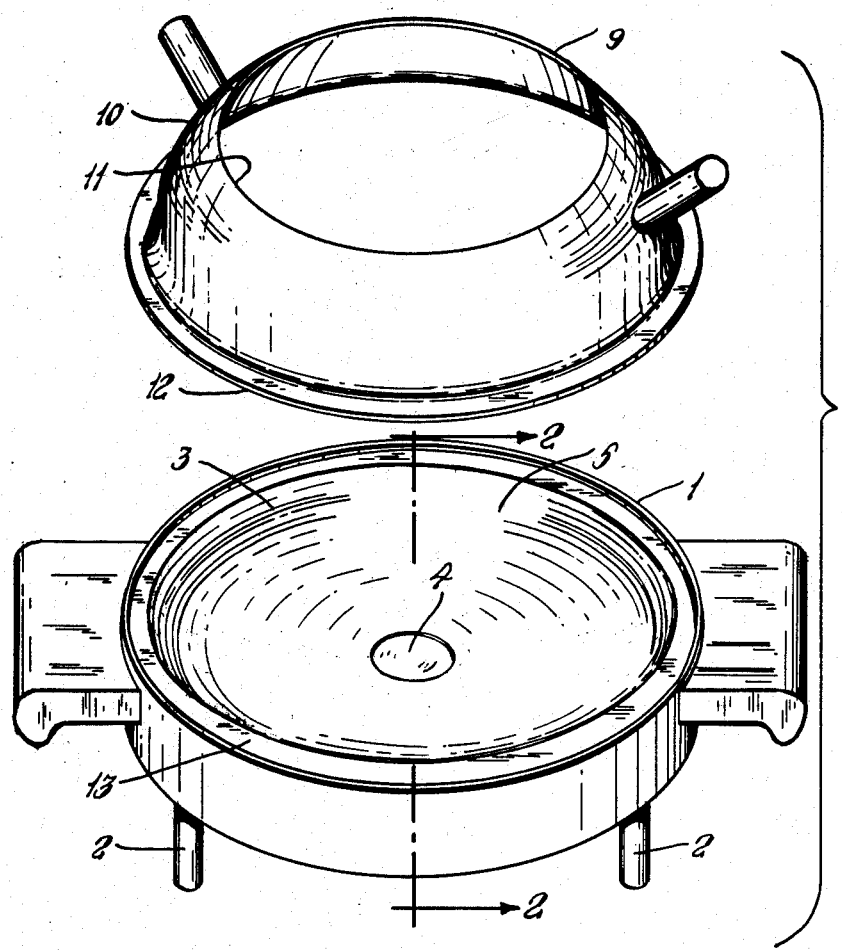
FIG. 1 is a perspective view of an embodiment made in accordance with this invention.

In the embodiment illustrated in the drawings, a saucer-shaped container 1 of any suitable material which has the properties of good thermal conduction as for example, stainless steel, is supported in an upright condition by a number of legs 2. The container is preferably saucer-shaped although any suitable configuration would serve the purpose providing a relatively large surface area of any liquid placed therein would be exposed to the atmosphere relative to its total volume. The container is heated by electrical heating elements which may be embedded within the walls of the container much as those used in electric fry pans or can be heated simply by a gas burner or by infra-red heating lamps. It is of course advantageous to employ electric heating elements since the temperature of the container can be controlled and maintained at any selected value by the use of thermostat as shown. The inner walls 3 of the container are concave and slope or are directed inwardly toward the central portion 4 which constitutes the lowermost point or position within the container. The inner surface of the container is provided with a coating 5 of a non-wetting material. The material being non-wettable by the solution to be concentrated, as for example, as shown in FIG. 2a, a silicone grease which is non-wetting by water resistant and impervious to the solution. The grease can be applied liberally to the surface and after use removed therefrom and a new coating applied or a thin plastic sheet first placed against the inner container surface 3 and the grease applied to the sheet 6, which after use may be removed with the grease as illustrated in FIG. 2b. The plastic sheet should be impervious and unaffected by either the grease or the solution to be placed in the container. An example of one such satisfactory sheet material, is a polymerized vinylidene chloride sold under the generic name "Saran." The silicone grease is applied either directly to the container or to the sheet and it has been found preferable to leave a small selected area of the lowermost portion of the inner container devoid of the grease where the solutes or solids remaining from the solution will accumulate. The relative area of this uncoated portion being dependent upon the type of solute, amount of solution, size of the container, etc.

With the advent of recent developments in materials, their application and fabricaiton, one suitable material of which the container may be fabricated is a tetrafluoroethylene polymer sold under the trade-name "Teflon" by the E. I. du Pont de Nemours & Co. In this embodiment illustrated in FIG. 3 the entire container may be fabricated of "Teflon" and the liquid solution heated by electric heaters immersed therin or by infra-red heating lamps 7 directed thereon. The heating elements which were previously described and stated as embedded within the container walls should be eliminated in order to prevent overheating of the "Teflon." It is of course obvious that in view of present techniques and as shown in FIG. 4, a coating of "Teflon" 8 may be bonded to the inner surface of any container not made of "Teflon" and this would result in a physical structure similar to that first described and illustrated in FIG. 1.

The two embodiments described and illustrated may of course be used at various installations or locations. At those locations where the container is not subjected to any movement and may be securely affixed to some relatively stationary immovable structure such as a table the container may be left open above the surface of the solution so as to provide better ventilation and hasten evaporation. This may also be substantially aided by providing an exhaust system such as a fan, to carry away the vapors emanating from the solution and to lower the liquid surface pressure.

On the other hand, where as aboard a ship or a moving vehicle, the liquid in the container is subjected to movement and spillage is possible, a cover must be provided to cover the open end of the container. Preferably the cover 9 should be of a material which is a good thermal insulator in order to minimize both loss of heat and condensation on the surface of the cover although favorable results and operation have been obtained for covers of various shapes and materials.

It is also useful, where a metallic cover is desirable, to coat the inner cover surface 10 which faces the liquid with a plastic or good insulator such as "Teflon," "Saran," or even grease.

The cover where used is provided with an opening 11 therethrough or a multiplicity of such openings disposed approximately central of the cover so that no liquid will escape therethrough while the vapors may be easily removed thereby. The shape of the cover in all cases should be one where the peripheral edge 12 of the cover constitutes a relatively liquid tight fitting with the edge 13 of the container 1. One possible type would be abutting lips on both or one of the edges or a liquid impervious gasket disposed between the abutting edges of the cover and container and a means for maintaining these edges in tight abutting relation with the gasket. The container edges might be made to overlap a portion of the lower cover edge but in any case the loss of liquid is prevented.

The invention itself and the illustrated embodiments can be best understood by simply explaining a typical use of the device and the procedures employed in operation. The inner walls of the container are first prepared by coating them with a silicon grease which is non-wetting for the solution to be used except for a small central area which is the lowermost portion of the container and where the solutes will be deposited. It is preferable to leave this area uncoated since the area over which the solute is deposited can thereby be selected although if the entire inner surface walls are coated the procedure would still be the same. It should be noted that where a "Teflon" coating has been applied, it is non-wetting with respect to substantially all the solutions normally encountered and is a permanent coating as opposed to silicones which are removed after each use. After the walls of the container are properly prepared, a selected quantity of the solution containing the radioactive solutes or solids is placed therein. Reference is here made to radioactive solutions, this, however, is only by way of example since this method and apparatus is equally well adapted to non-radioactive solutes where the concentration is small or where it exists only in trace quantities. With the solution in the container, evaporation is permitted to take place or as is preferable the evaporation is hastened. The container may be heated as by electric heating elements, the solution may be heated directly by heating elements placed therein or the solution may be heated by infrared or other types of heat lamps directed toward the solution surface. Where a cover is used over the solution to be concentrated, the pressure above the solution may be lowered by evacuating the atmosphere within the container or continually introducing dry air over the surface of the solution.

Although the solvent or carrier of the solution may be almost any liquid the most common, namely, water will be used for illustrative purposes. And further, it must be remembered that where reference is made to solute, solvent or solution, the strict chemical definition is not intended but it is herein used in its broader aspect so as to include among others the suspension of solids in a liquid, dispersion, etc. Therefore, starting with an aqueous solution containing traces of radioactive solute which cannot be measured or detected while in the aqueous state since the mean free particle paths are generally short and the attenuation of the water is considerable, the solution is concentrated by progressive evaporation within the container. As the solution is concentrated, the remaining aqueous solution and radioactive solute carried by it will not deposit on or adhere to the exposed container walls since they are coated with a non-wetting material and all of the solute will remain in solution. When there remains only a small quantity of solution the final evaporation will take place in the lowermost portion of the container which may be uncoated or void of any non-wetting material and therefore all the solute will be uniformly deposited thereon. Since all the solute of the original solution has been concentrated, it is a relatively simple matter to perform any desired measurement thereon as in the case of a radioactive solute one merely employs a radiation detector (GM type) and compares the reading so obtained from the unknown or test solution to the reading obtained by concentrating a known quantity and type of radioactive solute in a measured solution. This comparison may also be made on a calibrated radioactive source or obtained directly from a table or index.

This method has been successfully used on trace solutions (radioactive) where the starting concentration was of the order of one part in 100 million and it is known that equal success can be achieved for even lower concentrations.

The size and shape of the container and therefore its capacity are generally selected in advance, knowing the circumstances and test solutions under which the apparatus is to be used. It is not a difficult matter however to apply this method and apparatus to a continuous automatic concentrating system by continually introducing the solution into the container at a rate equal to or less than at which it is evaporating. This monitoring method is particularly well adapted to ships where a limited number of people are available and where it is not desirable to tie-up the ships personnel or where the concentration is so small that several evaporations would be required before a quantitative evaluation could be made. All that would be required is a metered input to the container so that when the final measurements were completed, the total solution from which the solutes were recovered would be known.

It will be understood that various changes in the details, materials, arrangement of parts and methods which have been herein described and illustrated in order to explain the nature of this invention, may be made by those skilled in the art within the principle and scope of the invention as expressed in the appended claims.

I claim:

1. An apparatus for concentrating the solid unevaporable constituents of a liquid which comprises, a container open at one end for confining and holding a liquid therein having approximately spherical walls progressively sloped toward a small lowermost portion opposite said one end the inner surface of said walls except those defining said lowermost portion being of a material non-wettable by said liquid, means for heating said liquid while confined in said container whereby as said liquid is progressively evaporated substantially all the solid constituents will be compacted and deposited uniformly within said lowermost portion.

2. The apparatus according to claim 1, wherein said lowermost portion is disposed centrally of said container.

3. The apparatus according to claim 1, wherein said heating means are thermostatically controlled electric heating elements and are disposed to heat said liquid.

4. The apparatus according to claim 3, wherein said container is provided with a removable cover to close said one end, said cover having an opening therethrough to provide an escape for any vapors emanating from said liquid as it evaporates.

5. The apparatus according to claim 1, wherein said solid constituents are radioactive.

References Cited in the file of this patent
UNITED STATES PATENTS

| | | |
|---|---|---|
| 1,402,238 | Mabee | Jan. 3, 1922 |
| 2,282,078 | Morey | May 5, 1942 |
| 2,470,593 | Webb | May 17, 1949 |
| 2,504,482 | Goldman | Apr. 10, 1950 |
| 2,839,662 | Theisen | June 17, 1958 |